US008212388B2

(12) United States Patent
Langgood et al.

(10) Patent No.: US 8,212,388 B2
(45) Date of Patent: Jul. 3, 2012

(54) MULTI-CAPACITY POWER SUPPLY FOR ELECTRONIC DEVICES

(75) Inventors: John K. Langgood, Cary, NC (US); Thomas F. Lewis, Raleigh, NC (US); Kevin M. Reinberg, Chapel Hill, NC (US); Kevin S. Vernon, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 12/266,956

(22) Filed: Nov. 7, 2008

(65) Prior Publication Data

US 2010/0117453 A1 May 13, 2010

(51) Int. Cl.
*H02J 3/00* (2006.01)
*H01R 13/44* (2006.01)
*H01R 27/00* (2006.01)

(52) U.S. Cl. .......................... 307/29; 439/136; 439/218

(58) Field of Classification Search .................... 307/29; 439/135

See application file for complete search history.

(56) References Cited

U.S. PATENT DOCUMENTS

| | | | |
|---|---|---|---|
| 4,053,788 | A | 10/1977 | Robie |
| 4,807,921 | A | 2/1989 | Champie, III et al. |
| 4,957,831 | A | 9/1990 | Meredith et al. |
| 5,753,979 | A | 5/1998 | Lam |
| 5,838,559 | A | 11/1998 | Lam |
| 5,967,807 | A | 10/1999 | Wu |
| 6,283,775 | B1 | 9/2001 | Shupe et al. |
| 6,330,144 | B1 | 12/2001 | Lee et al. |
| 6,913,473 | B2 | 7/2005 | Schmid et al. |
| 6,974,342 | B2 | 12/2005 | Thomas |
| 2004/0178681 | A1 * | 9/2004 | Klenner .......................... 307/66 |
| 2005/0073199 | A1 | 4/2005 | Jenkin |
| 2007/0052334 | A1 | 3/2007 | Chen |
| 2008/0156515 | A1 | 7/2008 | Jiang |

FOREIGN PATENT DOCUMENTS

GB 2296390 A 6/1996

OTHER PUBLICATIONS

"Voltage Selector Assembly", IBM Technical Disclosure Bulletin, pp. 1726-1727, Aug. 1, 1984.*

PCT/EP2009/06322, "PCT International Search Report and Written Opinion of the International Searching Authority, or the Declaration", Mar. 23, 2010, 10 pages.

"PCT Application No. PCT/EP2009/06322" filed on Oct. 21, 2009, International Business Machines Corporation, pp. 1-18.

"IEC Connector", http://en.wikipedia.org/wiki/IEC_connector, Sep. 23, 2008, 3 pages.

"The Different Types of AC Power Connectors in North America", White Paper #20, APC Legendary Reliability, pp. 1-10, 2007.

* cited by examiner

*Primary Examiner* — Hal Kaplan

(74) *Attorney, Agent, or Firm* — Cynthia G. Seal; Jeffrey L. Streets

(57) ABSTRACT

An electronic device may be provided with more than one industry-standard type of AC power connector. The electronic device may be powered in any of a variety of locations by selectively exposing one of the power connectors selected according to an AC power outlet available at that location. A location-specific power cord may be used to connect the exposed power connector to the AC power outlet. The location-specific power cord may have, for example, a line socket at one end of a type that matches the exposed power connector, and a power plug at the other end of a type that matches the AC power outlet at the location. Predefined power settings appropriate for use with the AC power outlet and the exposed power connector may be automatically invoked.

13 Claims, 3 Drawing Sheets

MULTI-CAPACITY POWER SUPPLY FOR ELECTRONIC DEVICES

BACKGROUND OF THE INVENTION

1. Field of the Invention

The present invention relates to powering an electronic device, and more particularly to connecting the electronic device to a power outlet.

2. Background of the Related Art

Electronic devices such as computer equipment are powered by connection to a source of alternating current (AC), such as an AC power outlet. This connection is typically made using a detachable power cord. The power cord has a female connector or "line socket" at one end that connects to a corresponding male connector on the back of the computer equipment, and a male connector or "plug" at the other end that connects to a power outlet. Generally, a female electrical connector may be referred to as a "socket," and a male electrical connector may be referred to as a "plug," which has an arrangement of prongs that are received by a corresponding arrangement of prong receptacles on the socket.

Electrical connectors are available in an array of types, which are generally established by standards bodies such as the International Electrotechnical Commission (IEC) and the National Electrical Manufacturers Association (NEMA). Connector types may be distinguished by physical size and shape (i.e. "form factor"), the number and arrangement of prongs (male) or corresponding prong receptacles (female), and by an electrical current rating. For example, personal computers and monitors typically use a ten-ampere C13 (female) and matching C14 (male) connector type specified by the IEC 60320 standard. Other computer equipment, such as some servers and UPS systems, use C19/C20 connectors also set forth by the IEC 60320 standard. As compared with the C13/C14 connectors, the C19/C20 connectors have a different form factor, different prong/receptacle arrangement, and a higher, sixteen-ampere current rating.

Additionally, most countries set their own standards for AC power outlets. Worldwide, most AC power outlets fall under one of two predominant voltage and frequency standards: the North American standard of 100-120V at 60 Hz (referred to commonly as "low line") and the European standard of 220-240V at 50 Hz (referred to commonly as "high line"). AC power outlets further vary by prong receptacle arrangement. To make an electronic device compatible with the many different AC power outlets available worldwide having different combinations of voltage, frequency and receptacle arrangements, manufacturers commonly provide a single, world-standard IEC connector on an electronic device, and a multitude of country-specific power cords. Each country-specific power cord includes a standard IEC connector on one end corresponding to the standard connector on the device and a national power plug at the other end corresponding to the type of wall socket available in the country where the device is intended to be sold or used.

This approach of manufacturing electronic devices with a standard IEC connector and providing different, country-specific cords allows the devices to be used with a variety of AC power outlets throughout the world. However, compatibility issues may still arise in some circumstances. For example, a universal power supply may work on both 110 and 220 volts. In the United States, the power coupler on the back of the power supply is typically 15 amps for 110 volts. The line cord matches the 15 amp power coupler to a 15 amp power plug. The 15 amp power plug plugs into a 15 amp wall outlet. In Australia, however, the wall outlets are typically 10 amps and 220 volts. In that scenario, a 15 amp power coupler is on the power supply and the wall outlet is 10 amps. A power cord could be made to work under such conditions, but the regulating agencies would likely disapprove the power cord under these conditions, because such a cord would allow a 15 amp device to be connected to a 10 amp wall outlet.

BRIEF SUMMARY OF THE INVENTION

One embodiment of the present invention provides a power supply for an electronic device. A plurality of AC power connectors supported on a chassis. A movable chassis member is supported on the chassis such that any position of the movable chassis member on the chassis exposes no more than one of the AC power connectors for connection to a power cord. An AC/DC converter has an AC input in electronic communication with at least the exposed AC power connector and a DC output for powering one or more electronic component. A power supply controller is configured to automatically invoke predefined power settings for the exposed AC power connector.

Another embodiment of the invention provides a method, wherein no more than one of a plurality of AC power connectors on an electronic device is exposed while the other AC power connectors are blocked. Predefined power settings are automatically invoked for the exposed AC power connector in response to the exposure of the exposed AC power connector. Alternating current is provided to the exposed AC power connector. The alternating current is converted to direct current according to the predefined power settings. The direct current is provided to an electronic subsystem to be powered.

DETAILED DESCRIPTION OF THE INVENTION

The present invention is directed, in part, to providing an electronic device with a single power supply having multiple power connectors from which to choose (e.g. both a 15-amp connector and a 10-amp connectors), to allow better matching between the electrical demands of the power supply and the multitude of different power outlets available worldwide. The invention may be embodied, for example, as a power supply for an electronic device having a plurality of power connectors supported on a chassis. A movable chassis member supported on the chassis may be movable between a plurality of distinct positions relative to the chassis to selectively expose only one of the plurality of power connectors in each position, such that only the exposed power connector may be physically connected with a power cord that is compatible with the exposed power connector. For each power connector, a manufacturer may provide a multitude of different power cords compatible with that power connector. For example, each location-specific power cord may be intended for use in a particular geographical region where a particular standard is used for AC power outlets. Power may be provided to the device at a particular geographical location by selecting a power cord having a connector at one end that matches the exposed power connector, and a plug at the other end that is specific to the type of AC power outlet available at that geographical location. A power supply controller may automatically invoke predefined power settings appropriate for the exposed power connector, and consume electrical power from the AC power outlet according to the predefined power settings. The power supply may convert the alternating current to direct current and supply the direct current to power one or more electronic components. By providing a single power supply with more than one type of power connector, the most appropriate power connector may be selected according to the location in consideration of the load drawn by the electronic device.

Figure 1:
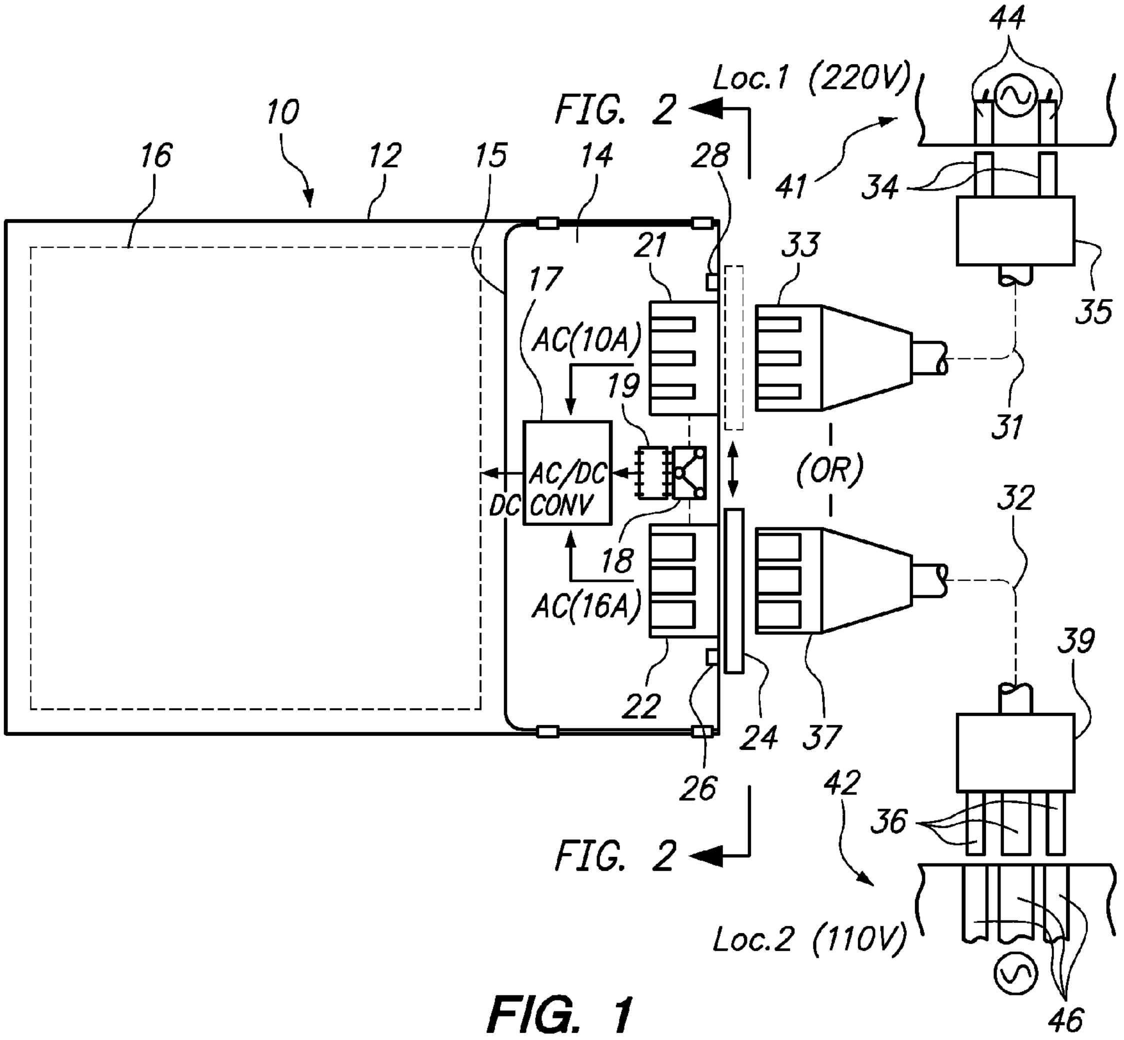
FIG. 1 is a schematic diagram of an electronic device having a power supply configured, according to an embodiment of the invention, to power the device using any of a variety of power outlets.

FIG. 1 is a schematic diagram of an electronic device 10 having a power supply 14 configured, according to an embodiment of the invention, to power the device 10 using any of a variety of power outlets. The device 10 has a device chassis 12 housing various electronic components, including the power supply 14 and an electronic subsystem 16 to be powered by the power supply 14. The power supply 14 has a power supply chassis 15, which may be (but is not required to be) integral with the device chassis 12. The electronic subsystem 16 includes any of a variety of device components to be powered by the power supply 14. For example, the device 10 may be a computer system and the electronic subsystem 16 may include electronic computer components such as memory and processors on a motherboard, a cooling fan, a hard drive, an optical drive, indicator lights such as LEDs, and so forth. The power supply 14 includes or is otherwise in electrical communication with at least two alternative electrical connectors 21, 22 of different types, either of which may receive a power cord for plugging the device 10 into a power outlet, as further described below. The electrical connectors 21, 22 are referred to hereinafter as "power connectors" because they are intended to receive electrical power from a power cord connected to an AC power outlet, for providing AC electrical power to the power supply 14. While only two power connectors 21, 22 are shown, one skilled in the art will appreciate that the teachings of this disclosure can be extended to embodiments with more than two power connectors. The power connectors may be constructed as any of a variety of electrical connector types, such as one of the standard connector types set forth by the IEC. For the purpose of discussion, the first power connector 21 is assumed to be an IEC C14 male connector having a ten-ampere rating and the second power connector 22 is assumed to be an IEC C20 male connector having a sixteen-ampere rating.

The device 10 may receive power by virtue of connecting either one of the power connectors 21, 22 to any of a variety of AC power outlets available worldwide using an appropriate power cord having a line socket at one end for connecting to one of the power connectors 21, 22 and a location-specific power plug at the other end for connecting to an AC power outlet. Of the many different power outlets available worldwide, a first power outlet 41 is shown by way of example at a first location ("Loc. 1") and a second power outlet 42 is shown at a second location ("Loc. 2"). The standard for each power outlet 41, 42 may be defined, for instance, in terms of the voltage and frequency of the electrical current provided to the electrical outlets 41, 42, the number, size, and arrangement of prong receptacles 44, 46 on the respective power outlets 41, 42, and the amperage rating for each electrical outlet 41, 42. While many different standards exist for AC wall outlets, the following discussion assumes, by way of example, that the first power outlet 41 is a high-line outlet having two prong receptacles 44 and operating at 10 amperes and 220V at 50 Hz, and that the second power outlet 42 is a low-line outlet having three prong receptacles 46 and operating at 15 amperes and 110V at 60 Hz.

A virtually unlimited number of different, location-specific power cords may be provided for use with each power connector 21, 22. By way of example, one power cord 31 is shown for optionally connecting the first power connector 21 to the first power outlet 41, and one power cord 32 is shown for alternatively connecting the second power connector 22 to the second power outlet 42. The first power cord 31 includes a ten-ampere C13 line socket 33 at one end for connecting to the corresponding type-C14 first power connector 21. At the other end, the first power cord 31 has a power plug 35 with an arrangement of prongs 34 corresponding to the arrangement of prong receptacles 44 on the first power outlet 41, for connecting the power plug 35 to the first power outlet 44. Similarly, the second power cord 32 includes a C19 line socket 37 at one end for connecting to the corresponding C20 second power connector 22 on the device 10. At the other end, the second power cord 32 has a power plug 39 with an arrangement of prongs 36 corresponding to the arrangement of prong receptacles 46 on the second power outlet 42, for connecting the power plug 39 with the second power outlet 42.

While each power connector 21, 22, alone, may be used in combination with any of a multitude of location-specific power cords for powering the device 10 in as many different locations, the inclusion of the two different power connectors 21, 22 increases compatibility of the device 10 among different electrical distribution systems, by allowing the device 10 to be powered under a wider variety of electrical loading scenarios. For example, in a particular location and/or for a particular electrical loading, the higher, sixteen-ampere current rating of the C19/C20 connector type may make the power connector 22 and power cord 32 more suitable for powering the device 10.

A movable chassis member is supported on the device chassis 12 and/or power supply chassis 15 to provide mutually exclusive exposure of the power connectors 21, 22, so that only one of the two power connectors 21, 22 may be used at a time to connect the device 10 to a power outlet. Multiple embodiments of the movable chassis member are within the scope of the invention. In the embodiment of FIG. 1, the movable chassis member comprises a cover 24 movably supported on the power supply chassis 15. The position of the cover 24 determines which of the two power connectors 21, 22 may be used, by selectively exposing one of the power connectors 21, 22 and simultaneously blocking the other of the power connectors 21, 22. The cover 24 is shown in a first position, which exposes the first power connector 21 for connecting with the line socket 33 of the first power cord 31 and covers the second power connector 22 to physically block the second power connector from receiving the line socket 37 of the second power cord 32. The cover 24 may be alternately moved to a second position (shown in phantom line type), which instead exposes the second power connector 22 for connecting with the line socket 37 of the second power cord 32 and blocks the first power connector 21 from connecting to the line socket 33 of the first power cord 31.

A different selection of power settings may be predefined for use with each power connector 21, 22 according to connector type. For example, the power settings selected for use with the first connector 21 may include a current limit of ten amperes appropriate for the C13/C14 connector type. Likewise, the power settings selected for use with the second power connector 22 may include a current limit of sixteen amperes appropriate for the C19/C20 connector type. Any unique combination of power settings may be associated with each different connector type, which will typically be expressed in terms of a particular combination of voltage, frequency, and current/amperage. These power settings may be enforced, in part, by a power supply controller 19 configured to invoke the power settings corresponding to the exposed power connector 21 or 22. A switch 18 included with or otherwise in communication with the power supply controller 19 is responsive to the position of the cover 24 to indicate which of the two power connectors 21, 22 is exposed. The switch 18 may be a mechanical type switch or an electronic switching device. For example, the cover 24 may be electrically and/or mechanically coupled with the switch 18 so that the position of the cover 24 determines the state of the switch 18. The state of the switch 18, in turn, may signal the PS controller 19 to invoke the predefined power settings to be applied to the exposed power connector. The switch 18 may also be used to selectively enable the exposed power connector and disable AC to the blocked power connector.

Optionally, one or more position sensors may be included in addition to or in lieu of the switch 18. For example, position sensors 26, 28 may be included to sense the position of the movable cover 24 and generate a signal to the PS controller 19 in response to invoke power settings selected for the exposed power connector 21 or 22. Thus, the optional first position sensor 26 may be configured as a switch that senses when the cover 24 is in the first position and generates a signal to the PS controller 19 in response, to invoke the defined power settings for the first power connector 21. Likewise, the optional second position sensor 28 may be configured as a switch that senses when the cover 24 is in the second position and generates a signal to the PS controller 19 in response to invoke the defined power settings for the second power connector 22. The position sensors 26, 28 may include, for example, proximity sensors that sense proximity of the cover 24 without physically contacting the cover 24. Alternatively, the position sensors 26, 28 may be electromechanical switches that are physically engaged by the cover 24 depending on its position.

In yet another option, it may be possible to replace the switch with first and second current sensors that detect current flowing through the first and second power connectors 21, 22, respectively, and provide a signal to the controller 19 indicating which power connector is being used. Still, the cover 24 will serve to prevent simultaneous use of both power connectors.

Figure 2:
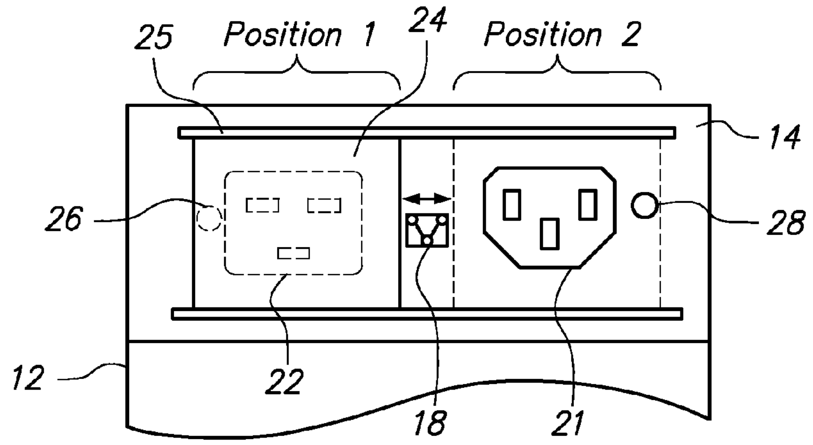
FIG. 2 is a schematic elevation view of the two power connectors and the movable cover of FIG. 1.

FIG. 2 is a schematic elevation view of the two power connectors 21, 22 and the movable cover 24. The cover 24 is movably secured to a track 25 that constrains the cover 24 to move linearly between the first and second positions. The cover 24 is not merely a removable cover, and therefore cannot be removed and repositioned to cover either of the two power connectors 21, 22, because the ability to remove the cover 24 would undesirably expose both power connectors 21, 22 simultaneously. While it may be possible to remove the cover 24 by a technician for servicing, such as to repair or replace a broken cover, the cover 24 remains secured to the track 25 during normal use to prevent more than one of the power connector 21, 22 from receiving a power cord. The cover 24 is normally manually slid along the track 25 by a user between the first and second positions, which selectively exposes one or the other (but not both) of the two power connectors 21, 22 for connection with an appropriate power cord. In this embodiment, the cover 24 completely covers the second power connector 22 when in the first position and completely covers the first power connector 21 when in the second position. However, the connection of a power cord to a power connector can be prevented without completely covering that power connector, and the shape of the cover 24 or extent to which the cover 24 covers a power connector may therefore vary between embodiments without departing from the scope of the invention.

Figure 3:
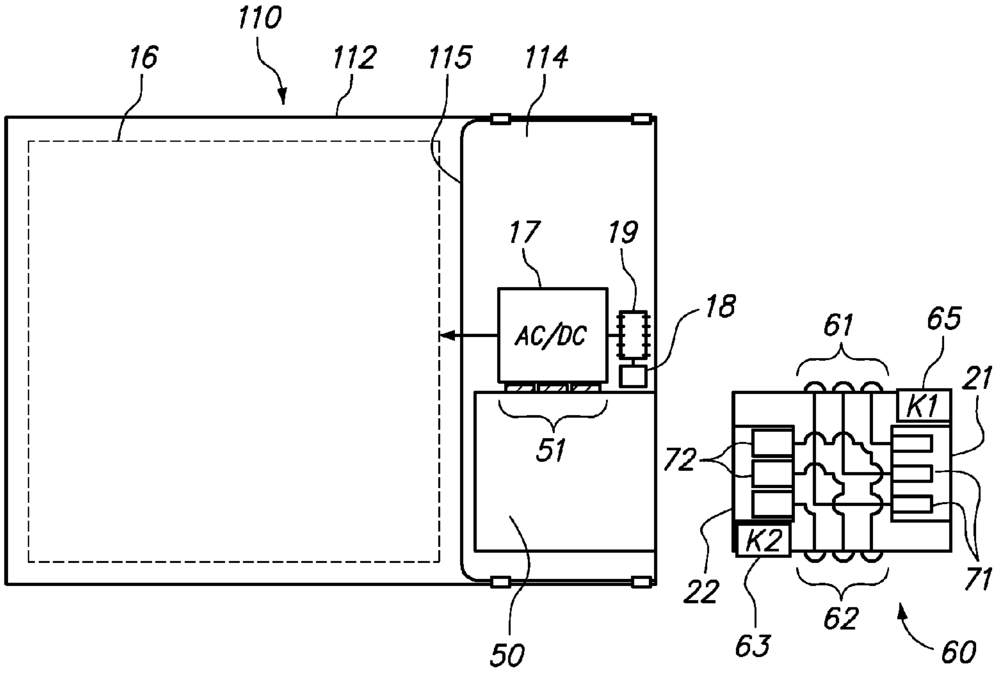
FIG. 3 is a schematic diagram of an electronic device having a power supply configured, according to another embodiment of the invention, to power the device by connection to any of a variety of power outlets.

FIG. 3 is a schematic diagram of an electronic device 110 having a power supply 114 configured, according to another embodiment of the invention, to power the device 110 by connection to any of a variety of power outlets. The device 110 may be, for example, a computer system having a device chassis 112. The device chassis 112 may be similar in appearance to the device chassis 12 in FIG. 1, but with the alternative power supply 114 for powering the electronic subsystem 16. The power supply 114 has a power supply chassis 115, which may be (but is not required to be) integral with the device chassis 112. The device chassis 112 includes a connector module bay 50 and a removable connector module 60 on which the two power connectors 21, 22 are carried. The two power connectors 21, 22 are still assumed, by way of example, to be C14 and C20 connectors, respectively. The connector module 60 may be interchangeably inserted in the module bay 50 in either of a first rotational position (see FIG. 4A) and a second rotational position (see FIG. 4B) distinct from the first rotational position. In particular, the second rotational position is 180 degrees opposite the first rotational position. A set of electrical contacts 51 are disposed within the power supply 114 adjacent to the connector module bay 50. The electrical contacts 51 are in communication with the AC-to-DC ("AC/DC") converter circuitry 17 of the power supply 114. The three prongs 71 on the first power connector 21 are wired to a corresponding first set of three electrical contacts 61 on the connector module 60. The three prongs 72 on the second power connector 22 are wired to a corresponding second set of three electrical contacts 62 on an opposing side of the connector module 60.

The switch 18 in this embodiment triggers the invocation of predefined power settings by the PS controller 19 in direct response to the rotational position of the connector module 60. Each of the two rotational positions of the connector module 60 causes a different switch state, and each state of the switch invokes a particular set of predefined power settings selected for the exposed power connector 21 or 22. The switch 18 may be embodied as or otherwise include a "key reader." A first key 63 ("K1") provided on the connector module 60 is uniquely associated with the first power connector 21. A second key 65 ("K2") provided in another location on the connector module 60 is uniquely associated with the second power connector 22. The switch 18 is configured to distinguish between the keys K1, K2 when in proximity to one of the keys K1, K2. For example, the keys K1, K2 may each include a distinct electronic, digital, magnetic, or optical signature, and the switch 18 may include an electronic, digital, magnetic, or optical reader configured for distinguishing between the two keys K1 and K2 based on the electronic, digital, magnetic, or optical signature.

Alternatively, the keys K1, K2 may be physical or mechanical keys having detectably-distinct configurations, such as a distinct size, shape, or position relative to the switch 18 when in readable proximity to the switch. Depending on the rotational position of the connector module 60, either K1 or K2 will be in readable proximity to the switch 18. In the rotational position of FIG. 4A, K1 will be in proximity to the switch 18. In the rotational position of FIG. 4B, K2 will instead be in proximity to the switch 18. Thus, the identity of the key being read implicitly indicates which of the two power connectors 21, 22 are exposed. The switch 18 "reads" the key by discerning which of the two keys K1 or K2 are in readable proximity to the switch 18. Thus, if the keys K1 and K2 have a discernable difference in size or shape, or if each key K1 and K2 has a discernable difference in position when in readable proximity to the switch 18, the switch 18 may thereby invoke a switch state according to the shape, size, or position of the key K1 or K2 currently in readable proximity to the switch 18. The PS controller 19 interprets the switch state to select the predefined power settings selected for the exposed power connector 21 or 22 accordingly.

Figure 4A:
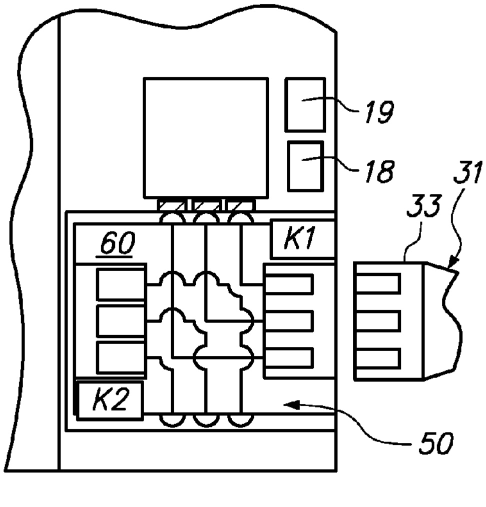
FIG. 4A is a schematic diagram showing the connector module releasably positioned in the module bay in the first rotational position.

FIG. 4A is a schematic diagram showing the connector module 60 as releasably positioned in the module bay 50 in the first rotational position. This rotational position exposes the first power connector 21 at an entrance 54 of the module bay 50 for detachably connecting with the C13 line socket 33 of the power cord 31, while concealing the second power connector 22. The first set of electrical contacts 61 on the connector module 60 contact the electrical contacts 51 in the module bay 50 to electrically connect the exposed first power connector 21 to the power supply 114, so that the power supply 114 can receive electrical power from the power cord 31. The rotational position of the connector module 60 in FIG. 4A also positions the key K1 in proximity to the switch 18. In response to detection of the key K1 by the switch 18, the PS controller 19 invokes the predefined power settings selected for the first power connector 21.

Figure 4B:
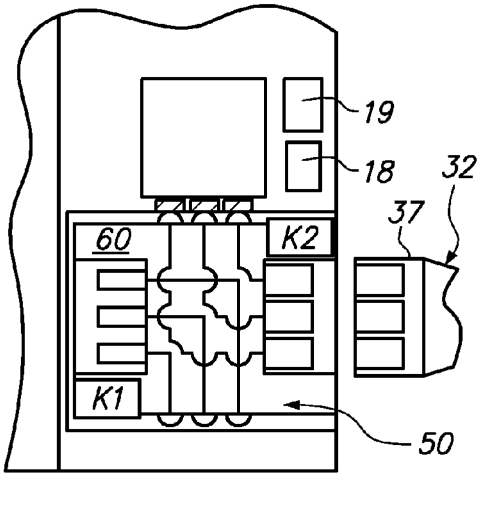
FIG. 4B is a schematic diagram showing the connector module releasably positioned in the module bay in a second rotational position, rotated 180 degrees from the rotational position of FIG. 4A.

FIG. 4B is a schematic diagram showing the connector module 60 as releasably positioned in the module bay 50 in the second rotational position, rotated 180 degrees from the rotational position of FIG. 4A. This second rotational position exposes the second power connector 22 at the entrance 54 of the module bay 50 for detachably connecting with the C19 line socket 37 of the power cord 32, while concealing the first power connector 21. The second set of electrical contacts 62 contact the electrical contacts 51 in the module bay 50 to electrically connect the exposed second power connector 22 to the power supply 114, so that the power supply 114 can receive electrical power from the power cord 32. The rotational position of the connector module 60 in FIG. 4B also positions the key K2 in proximity to the switch 18. In response to detection of the key K2 by the switch 18, the PS controller 19 invokes the predefined power settings selected for the second power connector 22.

One skilled in the art will recognize how the disclosure of the embodiment of FIGS. 3, 4A, and 4B could be extended to an embodiment having a connector module with more than two connectors. For example, to provide three different power connectors, a connector module with a generally triangular cross-section might be constructed with a different connector on each edge, and a device chassis may be provided with a generally triangular module bay for receiving the connector module in one of three different positions that expose one of the three power connectors and simultaneously conceals the other two power connectors.

Figure 5:
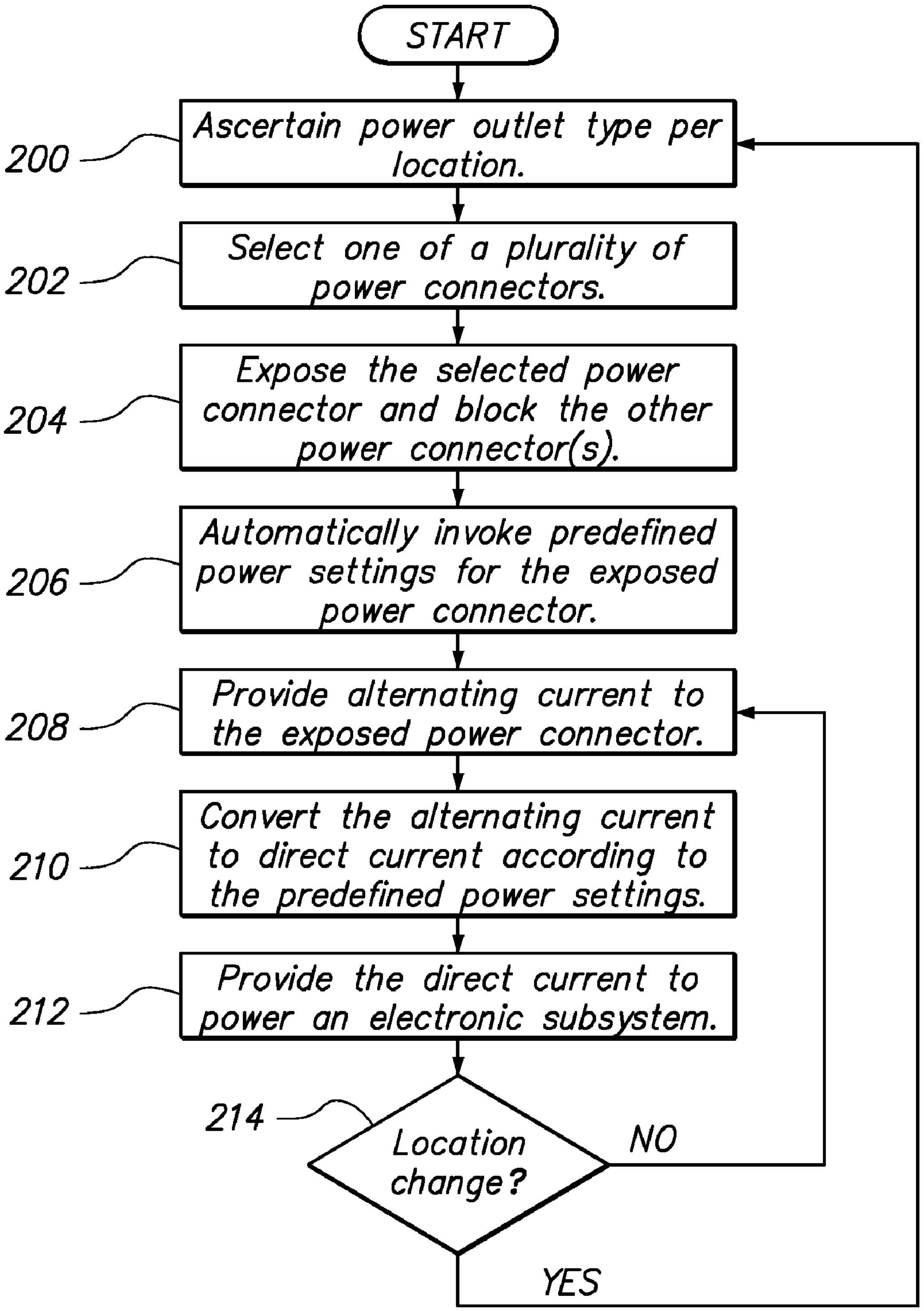
FIG. 5 is a flowchart outlining a method of powering an electronic device according to an embodiment of the invention.

FIG. 5 is a flowchart outlining a method of powering an electronic device according to an embodiment of the invention. While the description of the flowchart summarizes the steps of the method, additional details regarding these steps may be informed by reference to the preceding discussion of system and figures.

To power the electronic device at a particular location, the AC power outlet type is ascertained for that location, according to step 200. The AC power outlet type may specify the arrangement of prong receptacles at the power outlet, as well as the electrical specifications for the AC power outlet, such as the voltage, frequency, and current rating.

One of a plurality of power connectors is then selected according to step 202. For example the plurality of power connectors may be provided on the power supply for the electronic device. The most appropriate power connector may be selected in consideration of the expected electrical loading on the device and the electrical specifications for the AC power outlet. For example, if the AC power outlet has a fifteen-ampere current rating, then a power connector having a fifteen-ampere current rating or higher may be selected over another power connector having a current rating of less than fifteen amperes. A key consideration is matching the current rating of the outlet to the connector. The practical selection will typically be driven by the outlet type requiring a particular line cord, and that cord will have a given connector that will uniquely physically mate to the device connector.

According to step 204, the selected power connector is exposed while the remaining power connector(s) is/are at least partially blocked. For example, a movable chassis member or a removable connector module (discussed infra.) may be positioned by a user to expose the selected power connector.

According to step 206, predefined power settings are automatically invoked for the exposed power connector. For example, a switch may detect the position of a moveable chassis member and trigger a power supply controller to invoke the predefined power settings in response.

Alternating current is provided to the exposed power connector in step 208. Typically, providing alternating current to the exposed power connector will comprise using a location-specific power cord to connect the power supply to the AC power outlet. The power cord will typically have a connector (e.g. a line socket) at one end matched to the exposed power connector on the electronic device and having a power plug at the other end matched to the AC power outlet at that location.

In step 210, the alternating current is converted to direct current according to the predefined power settings. In the process of converting the alternating current to direct current, the power supply adheres to the predefined power settings, such as drawing alternating current within a current limit specified by the predefined power settings.

The direct current is provided to an electronic subsystem in step 212. For example, if the electronic device to be powered is a computer system, step 212 may include providing the direct current to a motherboard, a cooling fan, a hard drive, an optical drives, indicator lights such as LEDs, and so forth.

Conditional step 214 involves identifying a location change. For example, a change in location may result if the user brings or ships the electronic device from one country to another country having a different standard for AC power outlets. A change in location therefore prompts a determination of the power outlet type at the new location, as per step 200. The type of power outlet at the new location prompts the selection of a power connector as per step 202, because the type of AC power outlet available at the new location may affect the best choice of power connector. The outlined process continues as outlined, for the new location. The selected power connector is exposed (step 204), the power settings for the exposed power connector are invoked (step 206), alternating current is provided to the exposed power connector (step 208), the alternating current is converted to direct current within the constraints of the predefined power settings for the exposed connector (step 210), and the direct current is provided to the electronic subsystem (step 212).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A power supply for an electronic device, comprising:
- a chassis;
- a plurality of AC power connectors supported on the chassis;
- a movable chassis member supported on the chassis, comprising a cover secured to a track and constrained to move along the track to expose no more than one of the AC power connectors at a time for connection to a power cord;
- an AC/DC converter with an AC input in electronic communication with at least the exposed AC power connector and a DC output for powering one or more electronic component;
- one or more position sensor configured to sense a position of the cover and generate a signal in response to the sensed position indicating which one of the AC power connectors is exposed, and
- a power supply controller in communication with the one or more position sensor and configured to automatically invoke predefined power settings for the exposed AC power connector.

2. The power supply of claim 1, further comprising:
- wherein the one or more position sensors are configured as a switch having a distinct switch state associated with exposure of each AC power connector, each switch state triggering the power supply controller to invoke the predefined power settings for the exposed AC power connector.

3. The power supply of claim 2, wherein the switch automatically enables the exposed AC power connector and disables AC to the other AC power connectors.

4. The power supply of claim 1, wherein the power settings for a first AC power connector when exposed include a voltage in the range of between 220 and 240 volts and the power settings for a second AC power connector when exposed include a voltage in the range of between 100 and 120 volts.

5. The power supply of claim 4, wherein the power settings for the second AC power connector further include a current limit that is higher than a current limit of the first AC power connector.

6. A method, comprising:
- selectively exposing no more than one of a plurality of AC power connectors on an electronic device while blocking the other AC power connectors, comprising positioning a connector module in a module bay in one of a plurality of rotationally distinct positions that exposes one of the AC power connectors;
- automatically invoking predefined power settings for the exposed AC power connector in response to the exposure of the exposed AC power connector;
- providing alternating current to the exposed AC power connector;
- converting the alternating current to direct current according to the predefined power settings; and
- providing the direct current to an electronic subsystem to be powered.

7. The method of claim 6, wherein the step of providing alternating current to the exposed AC power connector comprises connecting one end of a power cord into the exposed AC power connector and connecting the other end of the power cord into an AC power outlet.

8. The method of claim 6, further comprising distinguishing between a plurality of keys each uniquely associated with one of the AC power connectors to determine which of the AC power connectors is exposed.

9. The method of claim 8, wherein the step of distinguishing between a plurality of keys comprises reading an electronic, digital, magnetic, or optical signature on the key associated with the exposed AC power connector.

10. The method of claim 8, wherein the step of distinguishing between a plurality of keys comprises distinguishing one or more of a size, shape, and position of the key associated with the exposed AC power connector.

11. A power supply for an electronic device, comprising:
- a chassis;
- a plurality of AC power connectors supported on the chassis;
- a movable chassis member supported on the chassis such that any position of the movable chassis member on the chassis exposes no more than one of the AC power connectors for connection to a power cord, wherein the movable chassis member comprises a connector module on which the plurality of AC power connectors are carried, the chassis comprises a module bay configured for releasably receiving the connector module in a plurality of distinct rotational positions, wherein in each rotationally distinct position an associated one of the AC power connectors is exposed and connected to an AC input of an AC/DC converter;
- a plurality of keys provided on the connector module, each key distinctly associated with one of the AC power connectors, wherein each rotationally distinct position of the connector module positions the associated key in readable proximity to a switch configured for invoking the predefined power settings for the exposed AC power connector;

an AC/DC converter with an AC input in electronic communication with at least the exposed AC power connector and a DC output for powering one or more electronic component; and a power supply controller configured to automatically invoke predefined power settings for the exposed AC power connector.

12. A power supply for an electronic device, comprising:

a chassis;

a plurality of AC power connectors supported on the chassis;

a movable chassis member supported on the chassis such that any position of the movable chassis member on the chassis exposes no more than one of the AC power connectors for connection to a power cord;

an AC/DC converter with an AC input in electronic communication with at least the exposed AC power connector and a DC output for powering one or more electronic component; and a power supply controller configured to automatically invoke predefined power settings for the exposed AC power connector;

a first power cord having a line socket at one end configured for mating with a first AC power connector and an AC power plug at the other end configured for mating with a first AC power outlet;

a second power cord having a line socket at one end configured for mating with a second AC power connector and a plug at the other end configured for mating with a second AC power outlet; and wherein the first and second AC power connectors have different electrical current ratings, the line socket and AC power plug of the first power cord have an electrical current rating matched to the current rating of the first AC power connector, and the line socket and AC power plug of the second power cord have an electrical current rating matched to the current rating of the second AC power connector.

13. A power supply for an electronic device, comprising:

a chassis;

a plurality of AC power connectors supported on the chassis;

a movable chassis member supported on the chassis, comprising a cover secured to a track and constrained to move along the track to expose no more than one of the AC power connectors at a time for connection to a power cord;

an AC/DC converter with an AC input in electronic communication with at least the exposed AC power connector and a DC output for powering one or more electronic component;

a current sensor configured to detect current flowing through the exposed AC power connector being used, and to provide a signal to the controller indication which power connector is exposed in response to the detected current; and a power supply controller in communication with the current sensor and configured to automatically invoke predefined power settings for the exposed AC power connector.

* * * * *